US012632611B2

(12) United States Patent
Pocha et al.

(10) Patent No.: US 12,632,611 B2
(45) Date of Patent: May 19, 2026

(54) SYSTEM AND METHOD FOR SECURE KEY MANAGEMENT FOR ENCRYPTED CORE DUMP

(71) Applicant: SAMSUNG ELECTRONICS CO., LTD., Suwon-si (KR)

(72) Inventors: Thejeswara Reddy Pocha, Bangalore (IN); Tushar Vrind, Bangalore (IN); Venkata Raju Indukuri, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 18/434,444

(22) Filed: Feb. 6, 2024

(65) Prior Publication Data

US 2024/0267216 A1 Aug. 8, 2024

(30) Foreign Application Priority Data

Feb. 6, 2023 (IN) .............................. 202341007317
Jan. 25, 2024 (IN) .............................. 202341007317

(51) Int. Cl.
G06F 21/78 (2013.01)
H04L 9/08 (2006.01)
H04L 9/30 (2006.01)

(52) U.S. Cl.
CPC ............ G06F 21/78 (2013.01); H04L 9/0869 (2013.01); H04L 9/0891 (2013.01); H04L 9/30 (2013.01)

(58) Field of Classification Search
None
See application file for complete search history.

(56) References Cited

U.S. PATENT DOCUMENTS

| | | | | |
|---|---|---|---|---|
| 11,106,522 B1 * | 8/2021 | Walls | ................... | G06F 11/1484 |
| 2018/0081824 A1 * | 3/2018 | Bacher | ................... | H04L 9/3271 |
| 2019/0215161 A1 * | 7/2019 | Bacher | ................... | H04L 9/0894 |
| 2022/0171671 A1 * | 6/2022 | Singh | ................... | G06F 11/1004 |
| 2024/0129743 A1 | 4/2024 | Lim et al. | | |

FOREIGN PATENT DOCUMENTS

| | | |
|---|---|---|
| WO | 2018131270 A1 | 7/2018 |
| WO | 2021 154466 A1 | 8/2021 |
| WO | 2022 214219 A1 | 10/2022 |

OTHER PUBLICATIONS

Communication dated Jun. 30, 2025 issued by the Intellectual Property India in Indian Patent Application No. 202341007317.
"All Curve25519 Parameters with Explanation", Jul. 6, 2020, 2 pages, https://crypto.stackexchange.com/questions/81773/all-curve25519-parameters-with-explanation.
"Set up SSH public key authentication to connect to a remote system", 2023, 7 pages, https://kb.iu.edu/d/aews.

* cited by examiner

*Primary Examiner* — Bradley W Holder
(74) *Attorney, Agent, or Firm* — Sughrue Mion, PLLC

(57) ABSTRACT

A method of a decryptor including receiving, from an encryptor of an electronic device, a core dump that has been encrypted with a symmetric key generated by the encryptor, and core dump metadata, extracting crash metadata from the core dump metadata, transmitting the crash metadata to a remote key server for regenerating the symmetric key, obtaining, from the remote key server, a regenerated symmetric key based the crash metadata, and decrypting the core dump based on the regenerated symmetric key and the crash metadata.

14 Claims, 9 Drawing Sheets

FIG. 6

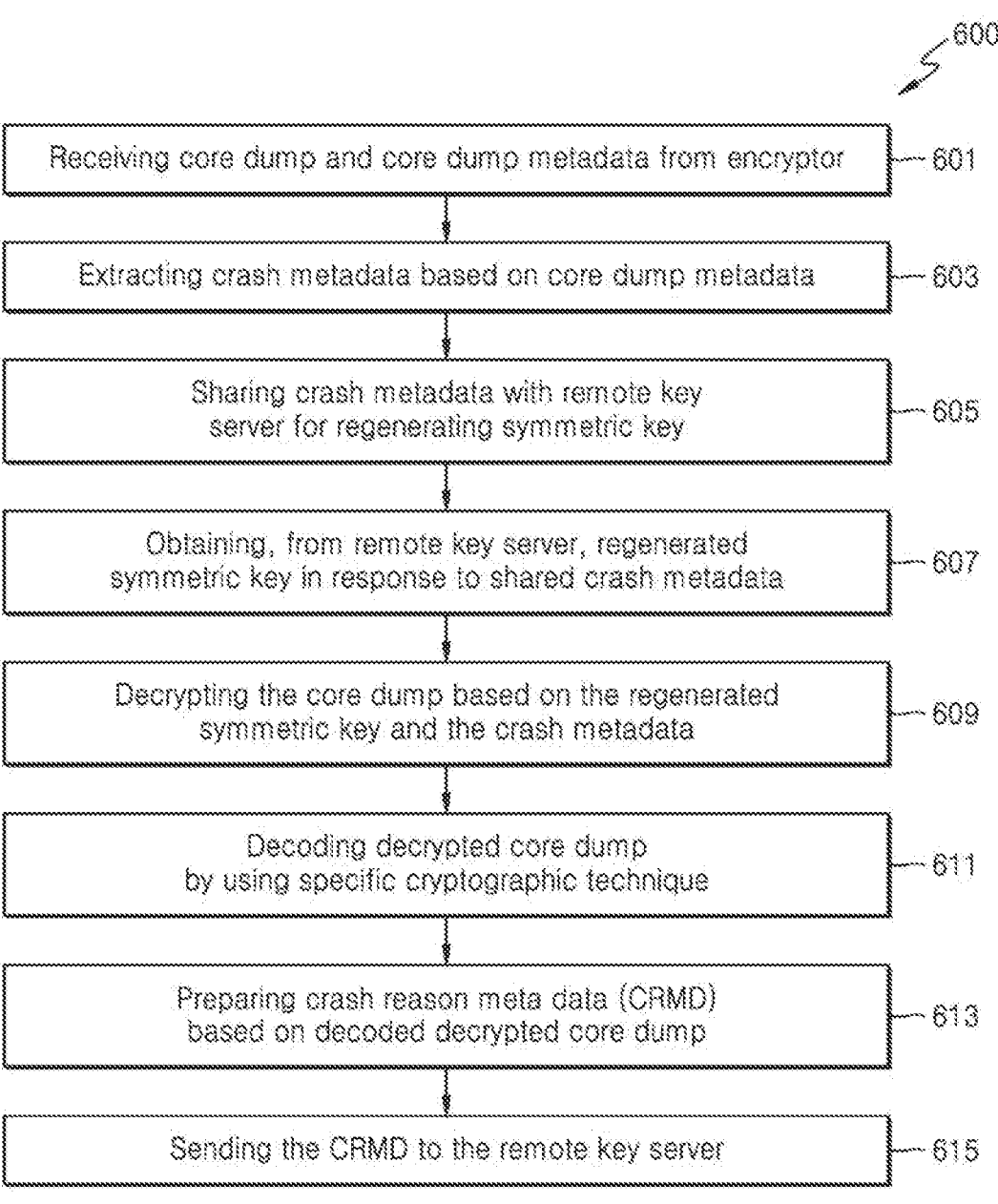

600

| | |
|---|---|
| Receiving core dump and core dump metadata from encryptor | 601 |
| Extracting crash metadata based on core dump metadata | 603 |
| Sharing crash metadata with remote key server for regenerating symmetric key | 605 |
| Obtaining, from remote key server, regenerated symmetric key in response to shared crash metadata | 607 |
| Decrypting the core dump based on the regenerated symmetric key and the crash metadata | 609 |
| Decoding decrypted core dump by using specific cryptographic technique | 611 |
| Preparing crash reason meta data (CRMD) based on decoded decrypted core dump | 613 |
| Sending the CRMD to the remote key server | 615 |

FIG. 7

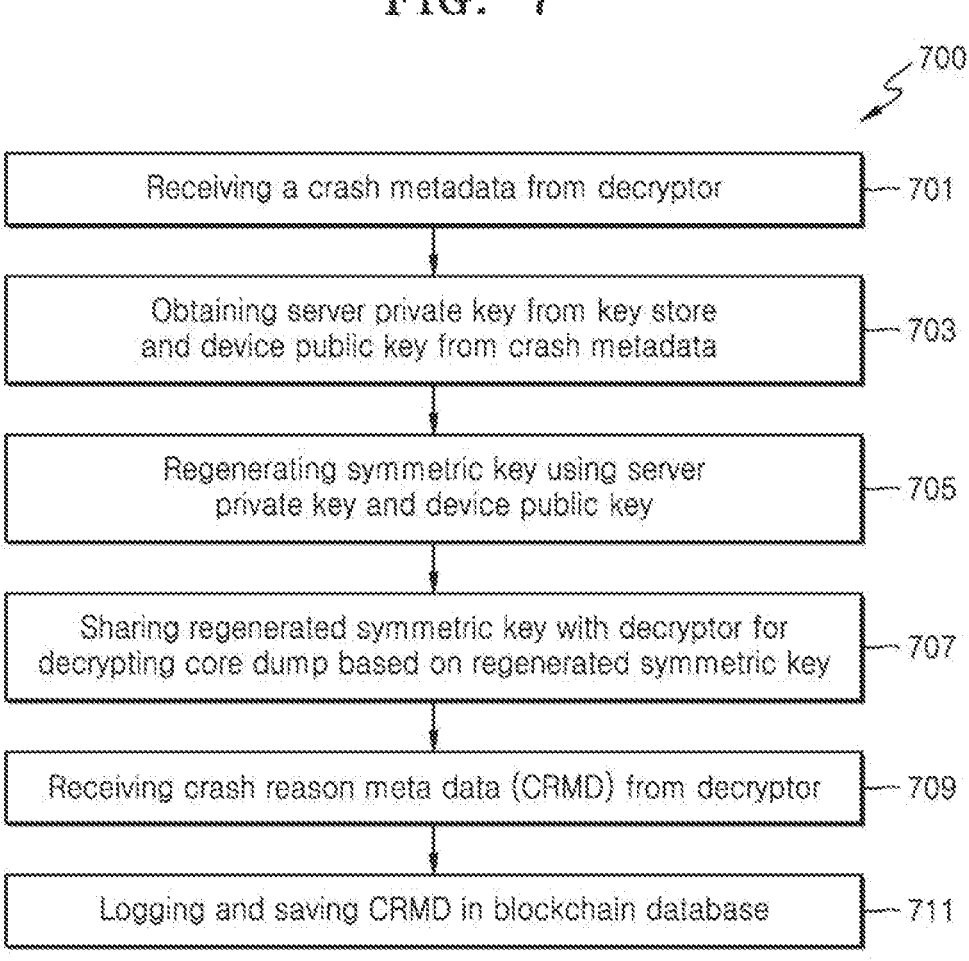

700

Receiving a crash metadata from decryptor — 701

Obtaining server private key from key store
and device public key from crash metadata — 703

Regenerating symmetric key using server
private key and device public key — 705

Sharing regenerated symmetric key with decryptor for
decrypting core dump based on regenerated symmetric key — 707

Receiving crash reason meta data (CRMD) from decryptor — 709

Logging and saving CRMD in blockchain database — 711

FIG.  8

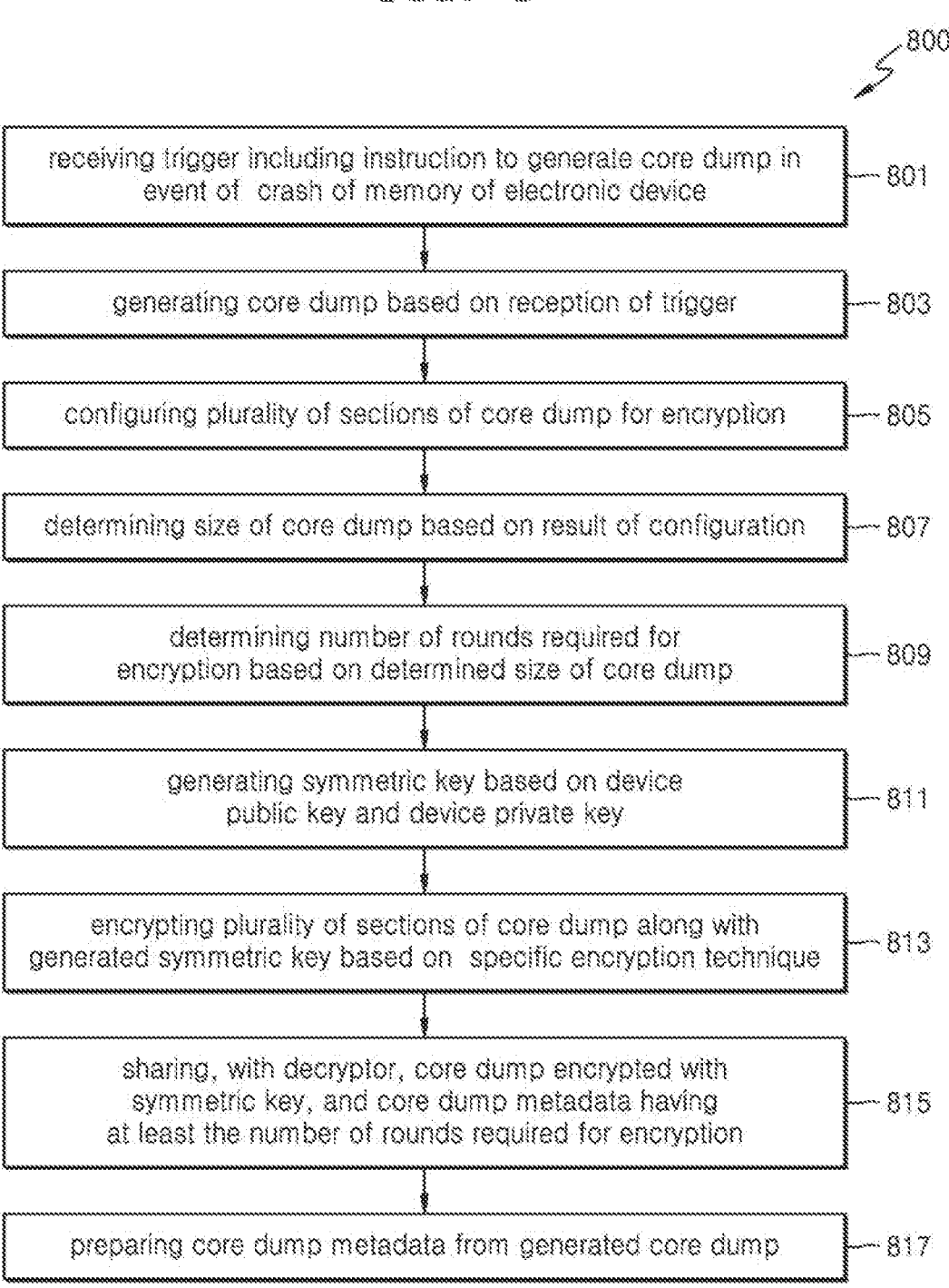

800 receiving trigger including instruction to generate core dump in event of crash of memory of electronic device — 801 generating core dump based on reception of trigger — 803 configuring plurality of sections of core dump for encryption — 805 determining size of core dump based on result of configuration — 807 determining number of rounds required for encryption based on determined size of core dump — 809 generating symmetric key based on device public key and device private key — 811 encrypting plurality of sections of core dump along with generated symmetric key based on specific encryption technique — 813 sharing, with decryptor, core dump encrypted with symmetric key, and core dump metadata having at least the number of rounds required for encryption — 815 preparing core dump metadata from generated core dump — 817

SYSTEM AND METHOD FOR SECURE KEY MANAGEMENT FOR ENCRYPTED CORE DUMP

CROSS-REFERENCE TO RELATED APPLICATIONS

This application is based on and claims priority under 35 U.S.C. § 119 to Indian Provisional Patent Application No. 202341007317, filed on Feb. 6, 2023, and Indian Patent Application No. 202341007317, filed on Jan. 25, 2024, in the Indian Patent Office, the disclosures of each which being incorporated by reference herein in their entireties.

BACKGROUND

Apparatuses, devices and methods consistent with the present disclosure related to the field of key management, and more particularly relate to a method and system for secure key management for encrypted core dump.

BACKGROUND

A modem processor is responsible for providing wireless communication and connectivity in a smartphone, spanning a range of technologies. Increased digitalization has led to smartphone usage in confidentiality critical communication needs such as banking, one-time password-based authentications, sending/receiving confidential data, digital rights management (DRM), etc., most of which are exchanged over a network using the modem baseband. While this use in confidentiality critical communication increases the demand and/or need for stronger security in digital communication, it also increases the risk of exposure of these critical security credentials to hackers through reverse engineering, snooping, or malware attacks. Most documented cyberattacks are found to be carried out after gaining significant knowledge about the design and operations of a computer system and/or network system.

SUMMARY

According to an aspect of one or more embodiments, there is provided a method implemented by at least one processor of a decryptor, the method comprising receiving, from an encryptor of an electronic device, a core dump that has been encrypted with a symmetric key generated by the encryptor, and core dump metadata; extracting crash metadata from the core dump metadata; transmitting the crash metadata to a remote key server for regenerating the symmetric key; obtaining, from the remote key server, a regenerated symmetric key based the crash metadata; and decrypting the core dump based on the regenerated symmetric key and the crash metadata.

According to another aspect of one or more embodiments, there is provided a method implemented by at least one processor of a remote key server for decrypting a core dump, the method comprising receiving, from a decryptor, crash metadata that includes at least one device public key; obtaining a server private key from a key store and a device public key from the crash metadata; regenerating a symmetric key based on the server private key and the device public key; and transmitting, to the decryptor, the regenerated symmetric key for decrypting the core dump based on the regenerated symmetric key.

According to another yet another aspect of one or more embodiments, there is provided a method implemented by at least one processor of an encryptor for encryption of a core dump at an electronic device, the method comprising receiving a trigger including an instruction to generate the core dump based on a crash of a memory of the electronic device; generating the core dump based on the trigger; configuring a plurality of sections of the core dump for encryption; determining a size of the core dump based on the plurality of sections; determining a number of rounds for encryption based on the size of the core dump; generating a symmetric key based on a server public key and a device private key; encrypting the plurality of sections of the core dump and the symmetric key based on a specific encryption technique; and transmitting, to a decryptor, the core dump that is encrypted with the symmetric key, and core dump metadata including at least the number of rounds for encryption.

According to yet another aspect of one or more embodiments, there is provided a decryptor for decrypting a core dump, the decryptor comprising a processor; and a memory coupled with the processor and storing program code, the processor being configured to access the program code and execute the program code to at least receive, from an encryptor of an electronic device, the core dump that has been encrypted with a symmetric key generated by the encryptor, and core dump metadata; extract crash metadata from the core dump metadata; transmit, to a remote key server, the crash metadata for regenerating the symmetric key; obtain, from the remote key server, a regenerated symmetric key based on the crash metadata; and decrypt the core dump based on the regenerated symmetric key and the crash metadata.

According to yet another aspect of one or more embodiments, there is provided a remote key server for decrypting a core dump, the remote key server comprising a key store; a processor; and a memory coupled with the processor and storing program code, the processor being configured to access the program code and execute the program code to at least receive, from a decryptor, crash metadata including at least one device public key; obtain a server private key from the key store and a device public key from the crash metadata; regenerate a symmetric key using the server private key and the device public key; and transmit the regenerated symmetric key to the decryptor for decrypting the core dump based on the regenerated symmetric key.

According to yet another aspect of one or more embodiments, there is provided an encryptor for encrypting a core dump at an electronic device, the encryptor comprising a processor; and a memory coupled with the processor and storing program code, the processor being configured to access the program code and execute the program code to at least receive a trigger including an instruction to generate the core dump based on a crash of a memory of the electronic device; generate the core dump based on the trigger; configure a plurality of sections of the core dump for encryption; determine a size of the core dump based on the plurality of sections; determine a number of rounds for encryption based on the size of the core dump; generate a symmetric key based on a server public key and a device private key; encrypt the plurality of sections of the core dump using the generated symmetric key based on a specific encryption technique; and transmit, to a decryptor, the core dump that is encrypted, and core dump metadata that includes at least the number of rounds for encryption.

BRIEF DESCRIPTION OF THE DRAWINGS

These above and other aspects will become better understood when the following detailed description is read with reference to the accompanying drawings, in which:

FIG. 6 is a flow diagram depicting a method implemented in a decryptor for decrypting a core dump, according to an embodiment;

FIG. 7 is a flow diagram depicting a method implemented in an RKS for decrypting a core dump, according to an embodiment; and FIG. 8 is a flow diagram depicting a method implemented in an encryptor for decrypting a core dump, according to an embodiment.

DETAILED DESCRIPTION

Figure 1:
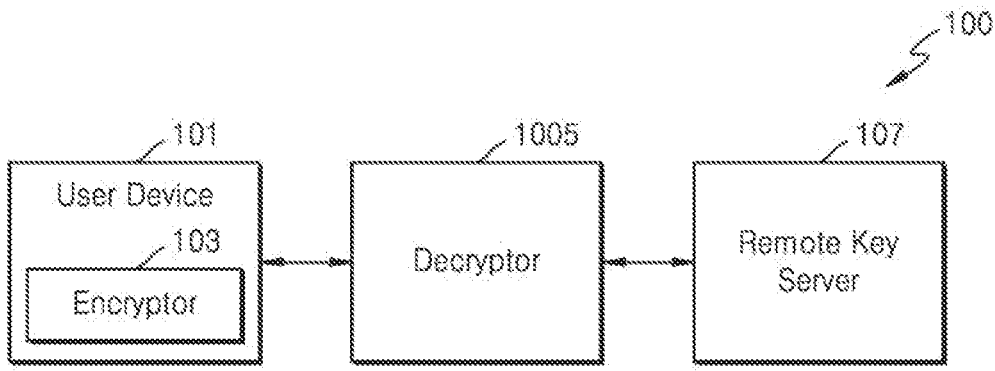
FIG. 1 is a block diagram depicting an exemplary architecture for secure key management for encrypted core dump, according to some embodiments.

In the accompanying drawings, like characters represent like parts throughout the drawings. Further, skilled artisans will appreciate that elements in the drawings are illustrated for simplicity and may not have necessarily been drawn to scale. For example, the flow charts illustrate a method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the various embodiments described herein so as not to obscure the drawings with details that will be readily apparent to those of ordinary skill in the art having the benefit of the description herein.

Reference will now be made to the various embodiments and specific language will be used to describe the same. It should be understood at the outset that although illustrative implementations of the various embodiments of the present disclosure are illustrated below, the various embodiments may be implemented using any number of techniques, whether currently known or in existence. The present disclosure is not necessarily limited to the illustrative implementations, drawings, and techniques illustrated below, including the exemplary design and implementation illustrated and described herein, but may be modified within the scope of the present disclosure.

It will be understood by those skilled in the art that the foregoing general description and the following detailed description are explanatory and are not intended to be restrictive.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment" and similar language throughout this specification may but do not necessarily, all refer to the same embodiment.

It is to be understood that as used herein, terms such as, "includes," "comprises," "has," etc. are intended to mean that the one or more features or elements listed are within the element being defined, but the element is not necessarily limited to the listed features and elements, and that additional features and elements may be within the meaning of the element being defined. In contrast, terms such as, "consisting of" are intended to exclude features and elements that have not been listed.

As used in this specification, the phrase "at least one of A, B, and C" includes within its scope "only A", "only B", "only C", "A and B", "B and C", "A and C", and "A, B, and C". Similarly as used in this specification, the phrase "at least one of A, B, or C" includes within its scope "only A", "only B", "only C", "A and B", "B and C", "A and C", and "A, B, and C".

The various embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive "or" unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms "first", "second", etc. may be used herein to describe various elements, these elements should not be limited by these terms. The terms "first", "second", etc. are generally only used to distinguish one element from another.

As described above, most cyberattacks are carried out after gaining significant knowledge about the design and operations of a computer system and/or network system. A core dump is one such attack vector (e.g., cyberattack vector) that may expose information that enables cyber intruders to discover vulnerabilities in the computer system and/or network system. The core dump contains the current execution state of a computer system, code (e.g., program code, computer readable instructions, etc.) that is currently in use, static strings, and data residing in memory at the time of failure of the computer system.

In the case of most related art embedded systems, all of the code resides in the memory at all times. There is no on-demand loading of code into memory. Hence, a core dump for such a system will contain all of the code stored in the memory. Most related art consumer devices will have the option of collecting a core dump for debugging purposes. One option to increase security would be to not allow the capturing of the core dump on a consumer device. However, even after expansive testing before release, some issues might surface only after the device has reached the customer. In such cases, a core dump would still be desired and/or required to debug and fix the issue.

Easy access to core dumps drives modem baseband processor attacks. Reports indicate that most reverse engineering of cellular modems is performed by accessing contents of a core dump of the modem baseband processor. Access to core dumps eases the identification of software loopholes, security vulnerabilities, and/or bugs. Malicious programs injected by exploiting these loopholes help hackers take control of the modem and/or extract confidential information, which the hackers otherwise may not be able to access.

A crash dump generated from a user equipment (UE) is encrypted with a symmetric key. For enhancing security, only the public key used in key derivation is shared in the crash dump. In various related art solutions, the key agreement and symmetric key are generated based on an elliptical curve integrated encryption scheme (ECIES). In the related art, there is little control over measuring the product quality for modems, as the accessibility of information is poor.

Thus, there is a need for a system and method to decrypt the encrypted dump without private key leakage as a private key is shared with a decryptor. Further, there is a need for a system and method that does not enable leaving the encrypted dump on the client as receiving a decrypted dump from the entity having the symmetric key will create additional delay due to dump transfer over network systems. Further, there is a need for a system and a method where the encryption of the dump should not impact the device core dump procedure. Further, there is a need for a system and a method for storage of symmetric key generated logs in a secure way.

A core dump generated from a user device may be encrypted by an encryptor of the user device. The encryptor may encrypt the core dump with a symmetric key generated from a private key of the user device and a public key associated with a decryptor. When the encrypted core dump is shared with the decryptor, only the public key is shared along with the encrypted core dump for enhanced security.

It is an aspect to provide a method of decrypting, in a decryptor, the encrypted core dump received from an encryptor along with only the public key. It is another aspect to provide a secure method to decrypt the encrypted dump without key leakage. It is yet another aspect to provide a mechanism for storing symmetric key-generated logs in a secure way.

According to an aspect of one or more embodiments, there is provided an encryptor for encrypting a core dump at an electronic device, a decryptor for decrypting the encrypted core dump, and a remote key server for regenerating a symmetric key to be used by the decryptor for decrypting the encrypted core dump. The disclosed technology enables secure key management for encrypted core dumps.

A detailed methodology is explained in the following paragraphs of the disclosure.

FIG. 1 is a block diagram 100 depicting an exemplary architecture for secure key management for an encrypted core dump, according to some embodiments. The architecture for secure key management for the encrypted core dump may include a user device 101 incorporating an encryptor 103.

The encryptor 103 may be configured to encrypt a core dump of the user device 101 based on a specific encryption technique. The encryptor 103 and operation thereof are described below in greater detail in conjunction with FIGS. 2, 5, and 8. The encrypted core dump is then shared with a decryptor 105.

The decryptor 105 is configured to decrypt the received encrypted core dump using a symmetric key. According to some embodiments, the symmetric key may be generated at a remote key server (RKS) 107.

In the present disclosure, a secure symmetric key generation mechanism is achieved by splitting the decryption process into symmetric key generation at the RKS and decrypting the encrypted core dump at the decryptor 105 using the symmetric key received from the RKS. The decryptor 105 and the RKS and operation thereof are described below in greater detail in conjunction with FIGS. 3 through 7.

Figure 2:
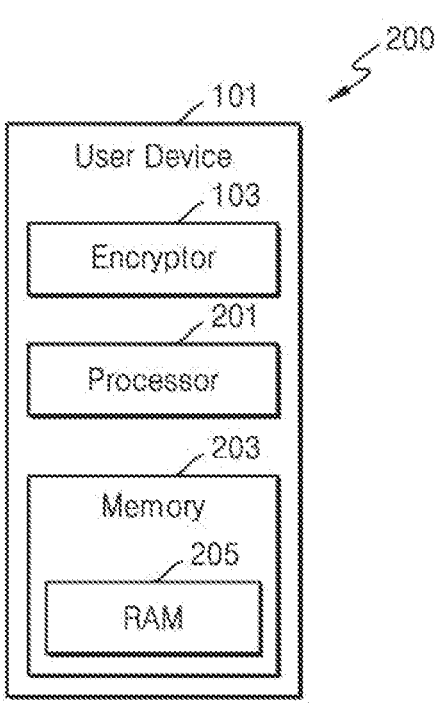
FIG. 2 is a block diagram depicting a user device, according to an embodiment.

FIG. 2 is a block diagram 200 depicting the user device 101, according to an embodiment. The user device 101 may include the encryptor 103, a processor 201, and a memory 203 coupled with each other. In a non-limiting example, the user device may correspond to a smartphone, a tablet, a laptop, a desktop computer, a workstation computer, a server, a wearable device, a networking device, other smart devices, an Internet of Things (IoT) device, a gaming console, a navigation device, an autonomous device (e.g., autonomous vehicle, etc.), a cloud device, a virtual reality device and/or an augmented reality device, a robotic device, and an electronic health care device.

In an example, in some embodiments, the processor 201 may be a single processing unit or a number of units, all of which may include multiple computing units. In some embodiments, the processor 201 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 201 is configured to fetch and execute computer-readable instructions, program code, and data stored in the memory 203.

In some embodiments, the memory 203 may include any non-transitory computer-readable medium known in the art including, for example, volatile memory or Random Access Memory (RAM) 205, such as static random access memory (SRAM) and/or dynamic random access memory (DRAM), and/or non-volatile memory, such as read-only memory (ROM), erasable programmable ROM, flash memories, hard disks, optical disks, and magnetic tapes.

In an embodiment, the user device 101 may further include the encryptor 103. In some embodiments, the encryptor 103 may be implemented by hardware encryptor logic separate from the processor 201. In some embodiments, the encryptor 103 may be implemented by the processor 201 executing encryptor program code, instructions, etc. stored in the memory 203. That is, in some embodiments, the memory 203 may store encryptor computer code, computer-readable instructions, and data for implementing the encryptor 103 such that when the memory 203 is accessed by the processor 201 and the encryptor computer code, computer-readable instructions, and data are executed by the processor 201, the encryptor computer code, computer-readable instructions, and data cause the processor 201 to implement the encryptor 103. The encryptor 103 is configured to receive a trigger including an instruction to generate a core dump in an event of a crash of a memory of the electronic device. In an embodiment, the trigger may correspond to an instruction, a fault, or an exception. In an exemplary embodiment, the trigger may be detected during the boot-up procedure, during normal operation of the user device 101, and/or in the event of a hardware or software error experienced by the user device 101.

Upon receiving the trigger, the encryptor 103 is configured to generate the core dump and to configure a plurality of sections of the core dump for encryption. In an embodiment, the generated core dump includes a plurality of parameters including at least one of a number of rounds required for encryption, a time required for completion of the encryption, a hash value of the symmetric key generated by the encryptor 103, a device public key, and model information.

In some embodiments, the encryptor 103 may determine a size of the core dump based on a result of the configuration of the plurality of sections. In an embodiment, the size of the core dump may be determined based on configuration details such as currently active radio access technology (RAT) and sensitive data information.

According to the some embodiments, based on the determined size of the core dump, the encryptor 103 determines a number of rounds required for encryption of the core dump. The encryptor 103 generates a symmetric key based on a device public key and a device private key associated with the user device 101. In an embodiment, the device public key and the device private key may be generated on every boot-up of the electronic device based on a random number generator technique. According to some embodiments, the symmetric key may be obtained based on a result of a key derivation technique from a server public key and a device private key.

In some embodiments, the encryptor 103 may encrypt the plurality of sections of the core dump using the generated symmetric key based on a specific key derivation technique and may share the core dump encrypted with the generated symmetric key to the decryptor 105. In an embodiment, the encryptor 103 may share core dump metadata along with the encrypted core dump with the decryptor 105.

Figure 3:
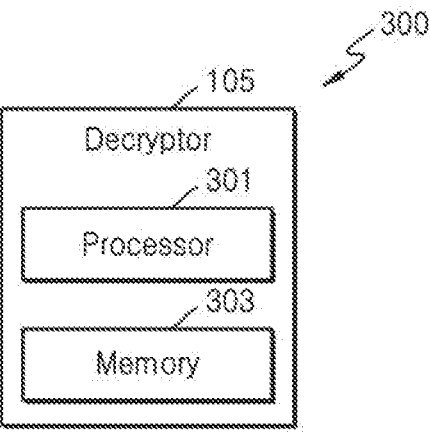
FIG. 3 is a block diagram depicting a decryptor, according to an embodiment.

FIG. 3 is a block diagram 300 depicting the decryptor 105, according to an embodiment. In some embodiments, the decryptor 105 may be a part of either a stand-alone electronic device or may be hosted on a server or cloud as a service (CaaS), that multiple users can access. In some embodiments, the decryptor 105 may be automated by bots to download logs and contact the server, generate the decrypted dump, perform auto analysis to determine a crash reason, and transmit the crash reason to the RKS 107 to update the crash reason to the RKS 107. The decryptor 105 may include a processor 301, and a memory 303 coupled with each other. The operation and structure of the processor 301 and the memory 303 is analogous to processor 201 and the memory 303 of FIG. 2. Therefore, for the sake of brevity explanation for is the processor 301 and the memory 303 are omitted here. In some embodiments, the decryptor 105 may be implemented by hardware decryptor logic separate from the processor 301. In some embodiments, the decryptor 105 may be implemented by the processor 301 executing decryptor program code, instructions, etc. stored in the memory 303. That is, in some embodiments, the memory 303 may store decryptor computer code, computer-readable instructions, and data for implementing the decryptor 105 such that when the memory 303 is accessed by the processor 301 and the decryptor computer code, computer-readable instructions, and data are executed by the processor 301, the decryptor computer code, computer-readable instructions, and data cause the processor 301 to implement the decryptor 105. The decryptor 105 shares the crash metadata with the RKS such that the crash metadata includes at least one of a device public key.

The decryptor 105 is configured to receive the core dump and the core dump metadata from the encryptor 103. The decryptor 105 may extract crash metadata from the received core dump metadata, and may share the extracted crash metadata with the RKS 107 which regenerates the symmetric key based on a server private key and the device public key obtained from the crash metadata using a key derivation technique. The decryptor 105 may obtain the regenerated symmetric key from the RKS 107 and decrypt the encrypted core dump based on the regenerated symmetric key and the crash metadata.

In an embodiment, the core dump metadata includes a plurality of parameters including at least one of a number of rounds required for encryption, a time required for completion of the encryption, a hash value of the symmetric key generated by the encryptor 103, a device public key, and model information. In some embodiments, the plurality of parameters are extracted as the crash metadata, and the device public key, and the model information, are included in the crash metadata while sharing the crash metadata with the RKS 107.

In an embodiment, the decryptor 105 may be configured to validate the regenerated symmetric key and a number of rounds required for decryption based on the hash value of the symmetric key included in the crash metadata.

In some embodiments, the decryptor 105 may decode the decrypted core dump by using a specific cryptographic technique and may prepare crash reason metadata (CRMD) based on the decoded decrypted core dump. In an embodiment, the CRMD includes at least one of a crash reason, an identifier of the symmetric key, a device public key, and information associated with the electronic device. In some embodiments, the identifier of the symmetric key may be from the RKS 107 when the symmetric key is regenerated. In some embodiments, the identifier is a unique number obtained randomly.

In some embodiments, the decryptor 105 may send the CRMD to the RKS 107 for logging the CRMD in the RKS 107 and for saving the CRMD in a blockchain database of the RKS 107.

Figure 4:
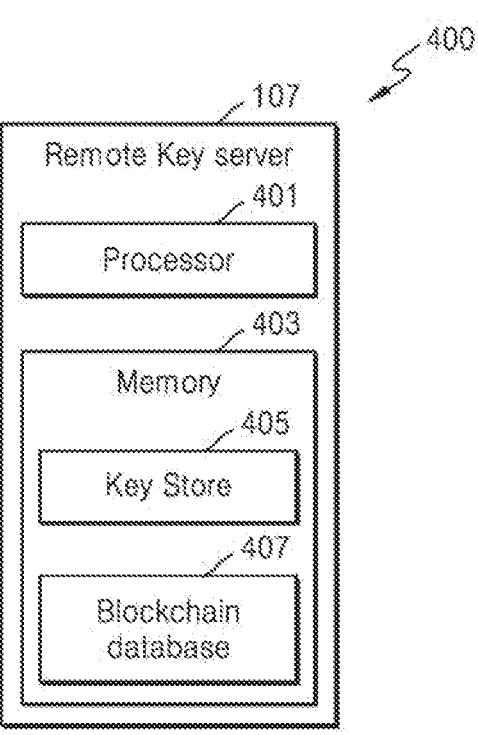
FIG. 4 is a block diagram depicting a remote key server (RKS), according to an embodiment.

FIG. 4 is a block diagram 400 depicting the RKS 107, according to an embodiment. In some embodiments, the RKS 107 may be deployed as a service on a cloud-based framework, or on a container. In some embodiments, the RKS service may be discoverable only to authenticated clients. In some embodiments, a pre-authenticator in the RKS 107 may validate the client credentials. In some embodiments, the RKS service may be configured to be reliable such that the RKS service may be deployed on server-less architecture, and may be always available based on a container service provider. In some embodiments, the RKS service may interface with a blockchain-based disturbed storage for key retrieval and crash reason metadata storage.

In an embodiment, the RKS 107 may include a processor 401, and a memory 403. The memory may include a key store 405, and a blockchain database 407. The operation and structure of the processor 401 and the memory 403 is analogous to processor 201 and the memory 203 of FIG. 2. Therefore, for the sake of brevity, explanation for the components is omitted here.

In an embodiment, the RKS 107 may be configured to receive the crash metadata from the decryptor 105, such that the crash metadata includes a device public key. Upon receiving the crash metadata, the RKS 107 may obtain a server private key from the key store 405 and may derive the device public key from the received crash metadata. In an embodiment, the RKS 107 may be configured to regenerate the symmetric key using the server private key and the device public key. In an embodiment, the RKS 107 may share the regenerated symmetric key with the decryptor 105 via a secured channel.

In an embodiment, the RKS 107 may receive the CRMD from the decryptor 105. Thereafter, the RKS 107 may log the CRMD and save the CRMD in the blockchain database 407.

Now an overall operation of the encryptor 103, the decryptor 105, and the RKS 107 to enable secure key management and decrypting encrypted core dump is described below in conjunction with the FIGS. 5A and 5B.

Figure 5A:
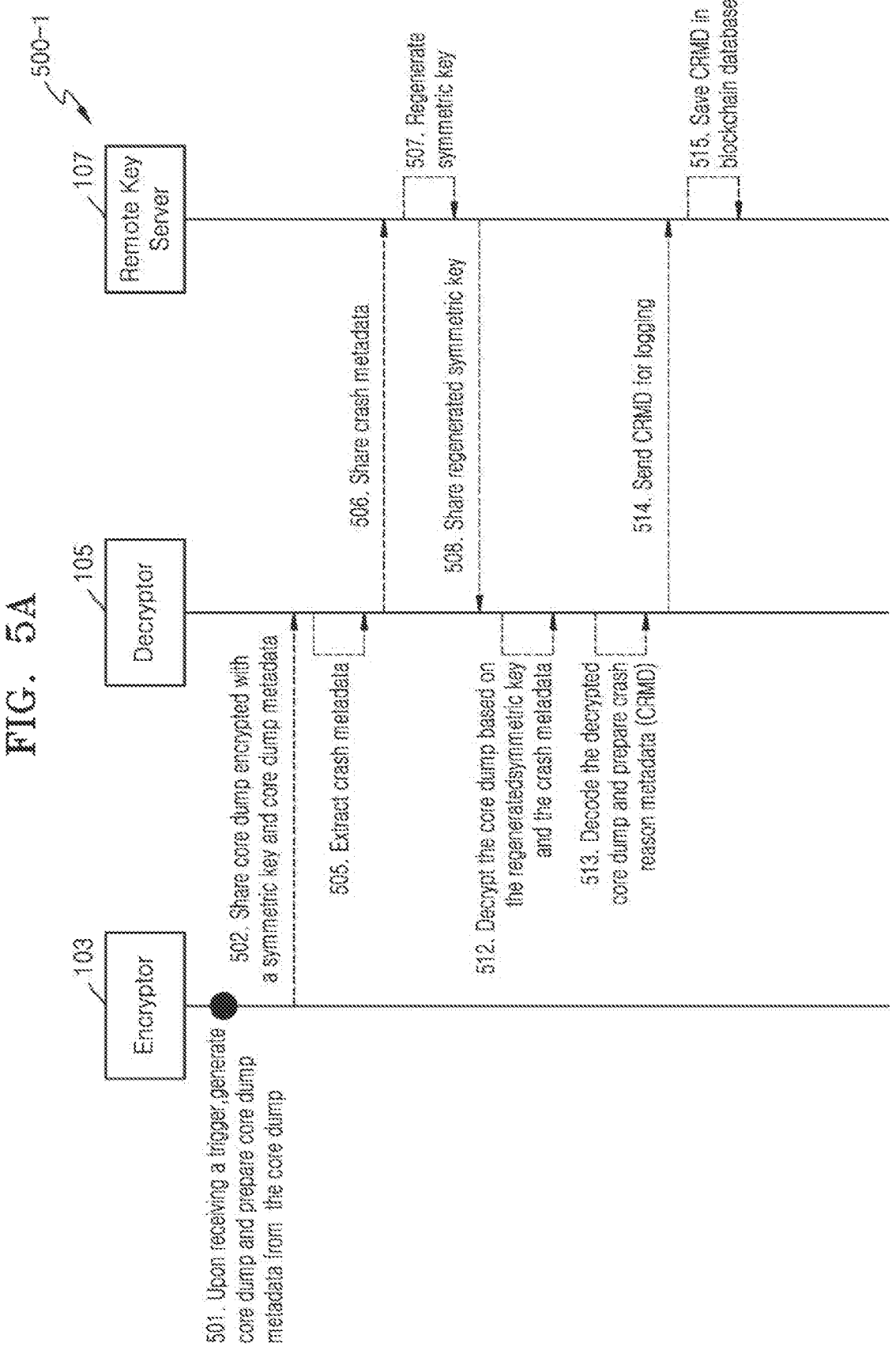
FIG. 5A is a schematic diagram depicting a flow of operations among an encryptor, a decryptor, and an RKS, according to some embodiments.

FIG. 5A is a schematic diagram 500-1 depicting a flow of operations among the encryptor 103, the decryptor 105, and the RKS 107, according to an embodiment. FIG. 5B is a flow diagram 500-2 depicting a flow of operation for decrypting an encrypted core dump at the decryptor 105, according to an embodiment. FIGS. 5A and 5B will be described together for the ease of understanding and sake of brevity.

At first, the encryptor 103, as depicted in operation 501, generates the core dump upon receiving the trigger. Here, the trigger may be an instruction, a fault, and/or an exception. Thereafter, the encryptor 103 prepares core dump metadata from the generated core dump. Further, the encryptor 103 configures the plurality of sections of the core dump for encryption and determines a size of the core dump. The encryptor 103 determines a number of rounds required for encryption based on the determined size of the core dump. Thereafter, the encryptor 103 encrypts the plurality of sections of the core dump using the symmetric key generated based on the device public key and device private key. In some embodiments, the encryptor 103 may encrypt the plurality of sections of the core dump according to the number of rounds that are determined.

At operation 502, the encryptor 103 shares the core dump encrypted with the symmetric key and the core dump metadata with the decryptor 105. For example, the encryptor 103 may transmit the core dump encrypted with the symmetric key and the core dump metadata to the decryptor 105. In an embodiment, the core dump metadata includes a plurality of parameters including at least one of a number of rounds required for encryption, a time required for completion of the encryption, a hash value of the symmetric key generated by the encryptor 103, a device public key, and model information. Therefore, the plurality of parameters may be extracted as the crash metadata at the decryptor 105, as described below.

Figure 5B:
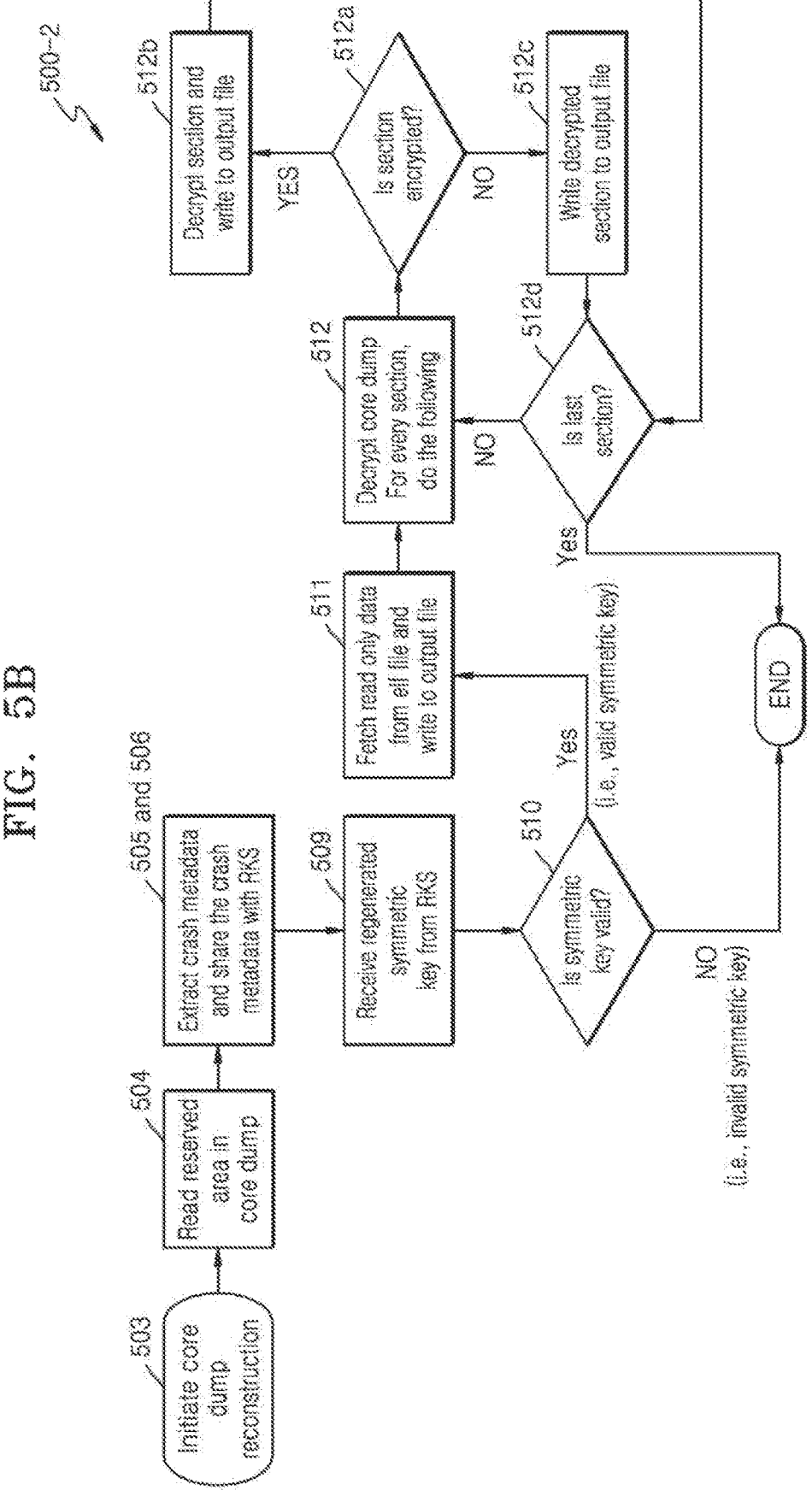
FIG. 5B is a flow diagram depicting a flow of operations for decrypting an encrypted core dump at a decryptor, according to some embodiments.

Upon receiving the core dump along with the core dump metadata from the encryptor 103, the decryptor 105 initiates the process of reconstructing the core dump, as depicted at operation 503 of FIG. 5B.

At operation 504, the decryptor 105 reads a reserved area in the received core dump. For example, the decryptor 105 may read the reserved area in the received core dump to obtain information associated with the plurality of sections of the encrypted core dump.

At operation 505, the decryptor 105 extracts the crash metadata. For example, the decryptor 105 may extract the crash metadata from the core dump metadata received along with the encrypted core dump from the encryptor 103.

At operation 506, the decryptor 105 shares the extracted crash metadata with the RKS 107. For example, the decryptor 105 may transmit the extracted crash metadata to the RKS 107 to obtain the symmetric key for decrypting the received encrypted core dump. In an embodiment, the crash metadata that is shared with the RKS 107 may include the device public key and the model information.

At operation 507, the RKS 107 regenerates the symmetric key. For example, the RKS 107 may initiate the process of regenerating the symmetric key. To regenerate the symmetric key, the RKS 107 obtains the server private key from the key store 405, and the device public key from the crash metadata received from the decryptor 105. In an embodiment, the key store 405 corresponds to a database of key-value pair types. In some embodiments, the crash metadata may include a device model which is a static value. Based on the device model, the server private key is fetched from key store 405. The RKS 107 regenerates the symmetric key based on the server private key and the device public key. The RKS 107 shares the regenerated symmetric key with the decryptor 105, as depicted at operation 508. For example, in some embodiments, the RKS 107 may transmit the regenerated symmetric key to the decryptor 105 via a secured channel.

At operation 509 of FIG. 5B, the decryptor 105 receives the regenerated symmetric key from the RKS 107. The decryptor 105 determines whether the received regenerated symmetric key is valid at operation 510. For example, the decryptor 105 may determine whether the regenerated symmetric key is valid based on a comparison with the hash value of the symmetric key included in the extracted crash metadata. Besides the regenerated symmetric key, in some embodiments the decryptor 105 may validate the number of rounds required for decryption. In an embodiment, the decryptor 105 obtains an executable and linkable (ELF) file from the RKS 107. In some embodiments, the ELF file may be obtained externally.

When the regenerated symmetric key is determined to be not valid (i.e., the regenerated symmetric key is invalid) (operation 510, No), the decryption process ends. When the regenerated symmetric key is determined to be valid (operation 510, Yes), the decryptor 105 proceeds to fetch read-only data from the ELF file, and write the read-only data to an output file at operation 511. For example, the decryptor 105 may obtain the read-only data from the ELF file obtained from the RKS 107 and write the read-only data to the output file. Thereafter, at operation 512, the decryptor 105 decrypts the core dump. For example, the decryptor 105 may decrypt the core dump based on the regenerated symmetric key and the extracted crash metadata.

In some embodiments, operation 512 may include operations 512a to 512d. To decrypt each section of the encrypted core dump, the decryptor 105, at operation 512a, determines if the section is encrypted. If the section is encrypted (operation 512a, Yes), said section is decrypted and written to the output file, as depicted at operation 512b. The decryptor 105 determines if the decrypted section is the last section, as depicted at operation 512d. If the section not encrypted (i.e., is decrypted) (operation 512a, No), the decrypted section is written to the output file, as depicted at operation 512c. The decryptor 103 determines if the decrypted section is the last section, as depicted at operation 512d. Operation 512 is performed for every section of the encrypted core dump and thus, if the last section is decrypted (operation 512d, Yes), the decryption process is ends.

At operation 513, the decryptor 105 decodes the decrypted core dump and prepares crash reason metadata (CRMD). In an embodiment, the decrypted core dump is decrypted using a specific cryptographic technique. The decryptor 105 may prepare the CRMD based on the decoded decrypted core dump. In an embodiment, the CRMD includes, among other information associated with the electronic device, a crash reason.

At operation 514, the decryptor 105 sends the CRMD to the RKS 107 for logging at the RKS 107.

At operation 515, the RKS 107 saves the CRMD in the blockchain database 407. The blockchain database 407 provides an immutable block of records and provides easy identification of clients requesting symmetric key generation. The logs of CRMD stored in the blockchain database 407 may be used to identify potential similar crashes across the commercial devices.

The methods implemented in the encryptor 103, the decryptor 105, and the RKS 107 are now described below in conjunction with FIGS. 6, 7, and 8.

FIG. 6 is a flow diagram depicting the method 600 implemented in the decryptor 105 for decrypting the core dump, according to an embodiment. The method 600 includes operations 601 through 613 executed by one or more components of the decryptor 105, e.g., by the processor 301.

At operation 601, the processor 301 receives the core dump and core dump metadata from the encryptor 103 of the electronic device 101. The core dump is encrypted with the symmetric key generated by the encryptor 103.

At operation 603, the processor 301 extracts crash metadata based on the core dump metadata.

In an embodiment, the core dump metadata includes a plurality of parameters including at least one of a number of rounds required for encryption, a time required for completion of the encryption, a hash value of the symmetric key generated by the encryptor 103, a device public key, and model information. The plurality of parameters may be extracted as the crash metadata.

At operation 605, the processor 301 shares the crash metadata with a remote key server for regenerating the symmetric key. In an embodiment, the device public key and the model information are included in the crash metadata that is shared with remote key server.

In an embodiment, the RKS 107 may regenerate the symmetric key using the server private key and the device public key. Further, the server private key may be obtain from the key store 405 and the device public key may be obtained from the crash metadata.

At operation 607, the processor 301 obtains, from the RKS 107, the regenerated symmetric key in response to the shared crash metadata.

At operation 609, the processor 301 decrypts the core dump based on the regenerated symmetric key and the crash metadata. For example, the processor 301 may decrypt the core dump based on the regenerated symmetric key regenerated by the RKS 107 using the server private key and the device public key.

At operation 611, the processor 301 decodes the decrypted core dump by using a specific cryptographic technique.

At operation 613, the processor 301 prepares CRMD based on the decoded decrypted core dump.

At operation 615, the processor 301 sends the CRMD to the remote key server. For example, the processor 301 may send the CRMD to the RKS 107 for logging the CRMD in the RKS 107 and saving the CRMD in a blockchain database of the RKS 107.

FIG. 7 is a flow diagram depicting the method 700 implemented in the RKS 107 for decrypting the core dump, according to an embodiment. The method 800 includes operations 701 through 711 executed by one or more components of the RKS 107, e.g., by the processor 401.

At operation 701, the processor 401 receives the core dump and the crash metadata from the decryptor 105. The crash metadata may include at least one device public key.

At operation 703, the processor 401 obtains the server private key from the key store 405 and the device public key from the crash metadata.

At operation 705, the processor 401 regenerates the symmetric key using the server private key and the device public key.

At operation 707, the processor 401 shares the regenerated symmetric key with the decryptor 105 for decrypting the core dump based on the regenerated symmetric key. In an embodiment, the regenerated symmetric key may be transmitted to the decryptor 105 via a secured channel.

At operation 709, the processor 401 receives the CRMD from the decryptor 105. In an embodiment, the CRMD may be prepared based on a decoding of the decrypting the core dump by the decryptor 105.

At operation 711, the processor 401 logs and saves the CRMD in the blockchain database 407.

FIG. 8 is a flow diagram depicting the method 800 implemented in the encryptor 103 for decrypting the core dump, according to an embodiment. The method 800 includes operations 801 through 817 executed by one or more components of the encryptor 103, e.g., by the processor 201.

At operation 801, the processor 201 receives the trigger including an instruction to generate a core dump in an event of a crash of a memory of the electronic device.

At operation 803, the processor 201 generates the core dump based on the reception of the trigger.

At operation 805, the processor 201 configures a plurality of sections of the core dump for encryption.

At operation 807, the processor 201 determines a size of the core dump based on a result of the configuration.

At operation 809, the processor 201 determines a number of rounds required for encryption based on the determined size of the core dump.

At operation 811, the processor 201 generates the symmetric key based on a server public key and a device private key. In some embodiments, the symmetric key may be generated based on a result of the encryption. In some embodiments, the device public key and the device private key may be generated on every boot-up of the electronic device based on a random number generator technique.

At operation 813, the processor 201 encrypts the plurality of sections of the core dump using the generated symmetric key based on a specific encryption technique.

At operation 815, the processor 201 shares, with the decryptor 105, the core dump encrypted with the symmetric key, and core dump metadata having at least the number of rounds required for encryption.

At operation 817, the processor 201 prepares the core dump metadata from the generated core dump.

According to various embodiments described above, the methods described in the embodiments herein ensure that compression of the encrypted core dump does not reduce the size of the core dump, thereby enabling the use of metadata to generate the symmetric key and in-place decryption of the encrypted core dump. Such techniques save network bandwidth and improve speed of decryption.

The methods described in the embodiments herein provide a mechanism to identify the potential device stability issues and region of issue. For example, the potential device stability issues and the region of issue may be identified based on the plurality of sections of the core dump.

The methods described in the embodiments herein prevent malicious user attempts by securely storing the private key in the remote key server.

While specific language has been used to describe the present subject matter, any limitations arising on account thereto, are not intended. As would be apparent to a person in the art, various working modifications may be made to the method in order to implement the embodiments as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While various embodiments have been particularly shown and described with reference to the drawings, it will be understood that various changes in form and details may be made therein without departing from the spirit and scope of the following claims.

We claim:

1. A method implemented by at least one processor of a decryptor, the method comprising:
   receiving, from an encryptor of an electronic device, a core dump that has been encrypted with a symmetric key generated by the encryptor, and core dump metadata;
   extracting crash metadata from the core dump metadata;
   transmitting the crash metadata to a remote key server for regenerating the symmetric key;
   obtaining, from the remote key server, a regenerated symmetric key based on the crash metadata; and
   decrypting the core dump based on the regenerated symmetric key and the crash metadata.

2. The method as claimed in claim 1,
   wherein the symmetric key is regenerated based on a server private key and a device public key, and
   wherein the server private key is obtained from a key store and the device public key is obtained from the crash metadata.

3. The method as claimed in claim 1,
   wherein the core dump metadata includes a plurality of parameters including a device public key and model information, and at least one of a number of rounds for encryption, a time for completion of the encryption, and a hash value of the symmetric key generated by the encryptor,
   wherein the plurality of parameters are extracted as the crash metadata, and
   wherein the crash metadata that is transmitted to the remote key server includes the device public key and the model information.

4. The method as claimed in claim 3, wherein:
   the plurality of parameters include the hash value, and
   the method further comprises validating the regenerated symmetric key and a number of rounds for decryption based on the hash value of the symmetric key included in the crash metadata.

5. The method as claimed in claim 1, further comprising:
   decoding the decrypted core dump by a specific cryptographic technique; and
   generating crash reason metadata (CRMD) based on the decoded decrypted core dump.

6. The method as claimed in claim 5, wherein the CRMD includes at least one of a crash reason, an identifier of the symmetric key, a device public key, and information associated with the electronic device.

7. The method as claimed in claim 6, further comprising:
   sending the CRMD to the remote key server for logging the CRMD in the remote key server and saving the CRMD in a blockchain database of the remote key server.

8. A decryptor for decrypting a core dump, the decryptor comprising:
   a processor; and
   a memory coupled with the processor and storing program code, the processor being configured to access the program code and execute the program code to at least:
   receive, from an encryptor of an electronic device, the core dump that has been encrypted with a symmetric key generated by the encryptor, and core dump metadata;
   extract crash metadata from the core dump metadata;
   transmit, to a remote key server, the crash metadata for regenerating the symmetric key;
   obtain, from the remote key server, a regenerated symmetric key based on the crash metadata; and
   decrypt the core dump based on the regenerated symmetric key and the crash metadata.

9. The decryptor as claimed in claim 8,
   wherein the symmetric key is regenerated by the remote key server using a server private key and a device public key, and
   wherein the server private key is obtained from a key store and the device public key is obtained from the crash metadata.

10. The decryptor as claimed in claim 8,
   wherein the core dump metadata includes a plurality of parameters including a device public key and model information, and at least one of a number of rounds for encryption, a time for completion of the encryption, and a hash value of the symmetric key generated by the encryptor,
   wherein the plurality of parameters are extracted as the crash metadata, and
   wherein the crash metadata that is transmitted to the remote key server includes the device public key and the model information.

11. The decryptor as claimed in claim 10, wherein the plurality of parameters includes the has value, and wherein the processor is further configured to execute the program code to validate the regenerated symmetric key, and a number of rounds for decryption based on the hash value of the symmetric key.

12. The decryptor as claimed in claim 8, wherein the processor is further configured to execute the program code to:

decode the decrypted core dump by a specific cryptographic technique; and generate crash reason metadata (CRMD) based on the decoded decrypted core dump.

13. The decryptor as claimed in claim 12, wherein the CRMD includes at least one of a crash reason, an identifier of the symmetric key, a device public key, and information associated with the electronic device.

14. The decryptor as claimed in claim 13, wherein the processor is further configured to execute the program code to:

send the CRMD to the remote key server for logging the CRMD in the remote key server and saving the CRMD in a blockchain database of the remote key server.

\* \* \* \* \*